United States Patent
Fukui et al.

(10) Patent No.: US 12,221,349 B2
(45) Date of Patent: Feb. 11, 2025

(54) EXFOLIATED GRAPHITE AND MANUFACTURING METHOD THEREFOR

(71) Applicants: SEKISUI CHEMICAL CO., LTD., Osaka (JP); OITA UNIVERSITY, Oita (JP)

(72) Inventors: Hiroji Fukui, Osaka (JP); Akira Nakasuga, Osaka (JP); Masahiro Toyoda, Oita (JP)

(73) Assignees: SEKISUI CHEMICAL CO., LTD., Osaka (JP); OITA UNIVERSITY, Oita (JP)

( * ) Notice: Subject to any disclaimer, the term of this patent is extended or adjusted under 35 U.S.C. 154(b) by 733 days.

(21) Appl. No.: 17/429,744

(22) PCT Filed: Feb. 26, 2020

(86) PCT No.: PCT/JP2020/007576
§ 371 (c)(1),
(2) Date: Aug. 10, 2021

(87) PCT Pub. No.: WO2020/175504
PCT Pub. Date: Sep. 3, 2020

(65) Prior Publication Data
US 2022/0119265 A1  Apr. 21, 2022

(30) Foreign Application Priority Data
Feb. 28, 2019 (JP) .................. 2019-035494

(51) Int. Cl.
*C01B 32/225* (2017.01)
*C01B 32/205* (2017.01)

(52) U.S. Cl.
CPC .......... *C01B 32/225* (2017.08); *C01B 32/205* (2017.08); *C01P 2002/82* (2013.01)

(58) Field of Classification Search
CPC . C01B 32/225; C01B 32/205; C01B 2204/04; C01B 32/19; C01B 32/182;
(Continued)

(56) References Cited

U.S. PATENT DOCUMENTS 6,149,972 A  11/2000  Greinke
2001/0046557 A1  11/2001  Greinke et al.
(Continued)

FOREIGN PATENT DOCUMENTS

CN  102583350  7/2012
CN  105417529  3/2016
(Continued)

OTHER PUBLICATIONS

Schlogl, et al., The Reaction of Potassium-Graphite Intercalation Compounds With Tetrahydrofuran, Carbon 1984; 22(4/5): 341-349 (Year: 1984).*
(Continued)

*Primary Examiner* — Daniel C. McCracken
(74) *Attorney, Agent, or Firm* — Wenderoth, Lind & Ponack, L.L.P.

(57) ABSTRACT

Provided are exfoliated graphite that rarely folds, rarely curls, and rarely causes corrosion of an electrode when used as the electrode material, and a method for manufacturing the exfoliated graphite. Exfoliated graphite being graphene or a laminate of graphene sheets, the exfoliated graphite having a ratio 2 D/G of 0.5 or more and 5.0 or less, the ratio 2 D/G being a peak area ratio of a 2 D band to a G band in a Raman. spectrum measured. using Raman spectroscopy, and a halogen content of 1,000 ppm or less.

5 Claims, 4 Drawing Sheets

(58) Field of Classification Search
CPC ... C01B 32/184; C01B 32/186; C01B 32/188; C01B 32/192; C01B 32/194; C01B 32/196; C01B 32/198; C01B 2204/00; C01B 2204/02; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/21; C01B 32/215; C01B 32/22; C01B 32/23; C01P 2002/82; H01G 11/86; H01G 11/32; H01G 11/36; H01M 4/366; H01M 4/587; G01N 21/65; Y02E 60/10

See application file for complete search history.

(56) References Cited

U.S. PATENT DOCUMENTS

| | | | |
|---|---|---|---|
| 2006/0058443 | A1 | 3/2006 | Ohashi et al. |
| 2016/0298244 | A1* | 10/2016 | Abdelkader .......... C01B 32/198 |
| 2017/0203968 | A1* | 7/2017 | Al-Hazmi ............... C01B 32/23 |
| 2018/0233684 | A1 | 8/2018 | Umeda |

FOREIGN PATENT DOCUMENTS

| | | |
|---|---|---|
| CN | 107082421 | 8/2017 |
| JP | 2005-272555 | 10/2005 |
| JP | 2015-105200 | 6/2015 |
| JP | 2017-19695 | 1/2017 |
| KR | 10-2013-0037329 | 4/2013 |
| WO | 2017/065067 | 4/2017 |

OTHER PUBLICATIONS

International Preliminary Report on Patentability issued Aug. 25, 2021 in International (PCT) Application No. PCT/JP2020/007576.

International Search Report (ISR) issued Apr. 21, 2020 in International (PCT) Application No. PCT/JP2020/007576.

Jungmo Kim et al., "Extremely large, non-oxidized graphene flakes based on spontaneous solvent insertion into graphite intercalation compounds", Carbon, vol. 139, pp. 309-316, Jun. 30, 2018, cited in ISR.

Hiroshi Yoshitani et al., "Preparation of few-layered graphene using Graphite Intercalation Compounds (GICs)", Recent Progress in Graphene & 2D Materials Research, Program e-Book, Oct. 9, 2019, 9p-59, [retrieved on Apr. 2, 2020], Internet: <URL:http://a3-2dmaterials.jp/rpgr2019program/>, 2. Materials and methods, 3. Results and discussion, cited in ISR.

Inagaki, M. et al: II Production of exfoliated graphite from potassiumgraphite-tetrahydrofuran ternary compounds and its applications, Synthetic Metals, Elsevier Sequoia Lausanne, CH, vol. 8, No. 3-4, Dec. 1, 1983 (Dec. 1, 1983), pp. 335-342, XP024171587, ISSN: 0379-6779, DOI: 10.1 016/0379-6779(83)90117-0 [retrieved on Dec. 1, 1983].

Schlogl Ret al: "The reaction of potassium-graphite intercalation compounds with tetrahydrofuran", Carbon, Elsevier Oxford, GB, vol. 22, No. 4-5, Jan. 1, 1984 (Jan. 1, 1984 ), pp. 341-349, XP024033452, ISSN: 0008-6223, DOI: 10.1 016/0008-6223(84)90004-6 [retrieved on Jan. 1, 1984].

Chakraborty Setal: "Functionalization of potassium graphite", Angewandte Chemie International Edition, Verlag Chemie, vol. 46,Mar. 3, 2007 (Mar. 3, 2007), pp. 4486-4488, XP002481416, ISSN: 1433-7851, Doi: 10.1002/ANIE.200605175.

Ferrari et al: "Raman spectroscopy of graphene and graphite: Disorder, electron-phonon coupling, doping and nonadiabatic effects", Solid State Communications, Pergamon, GB, vol. 143, No. 1-2, Jun. 7, 2007 (Jun. 7, 2007), pp. 47-57, XP022130931, ISSN: 0038-1098, DOI: 10:1 016/J.SSC.2007.03.052.

Extended European Search Report issued Oct. 17, 2022 in corresponding European Patent Application No. 20763191.2.

* cited by examiner

[FIG. 1]
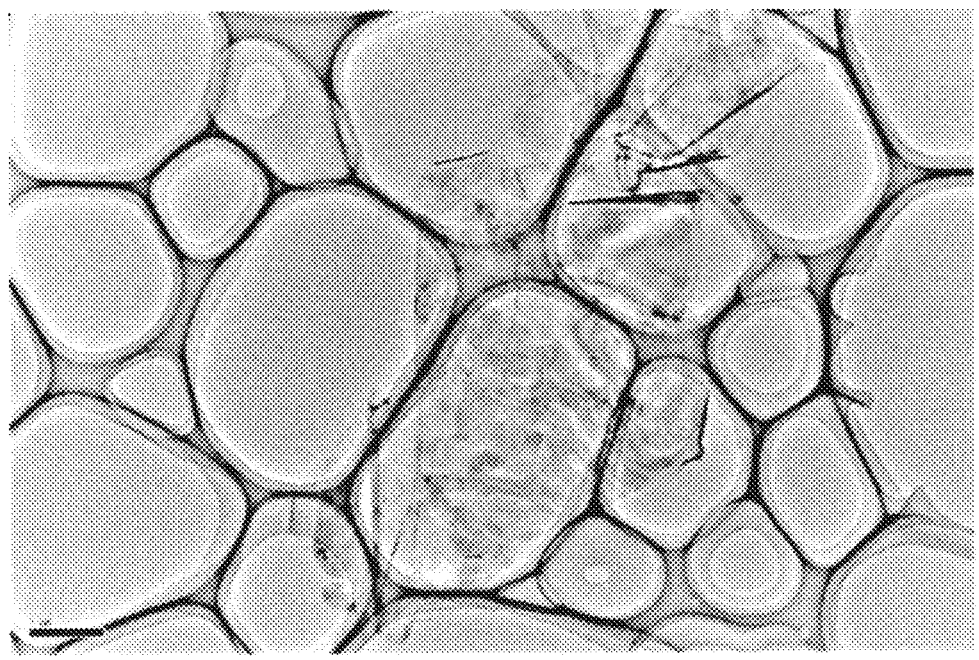
[FIG. 2]
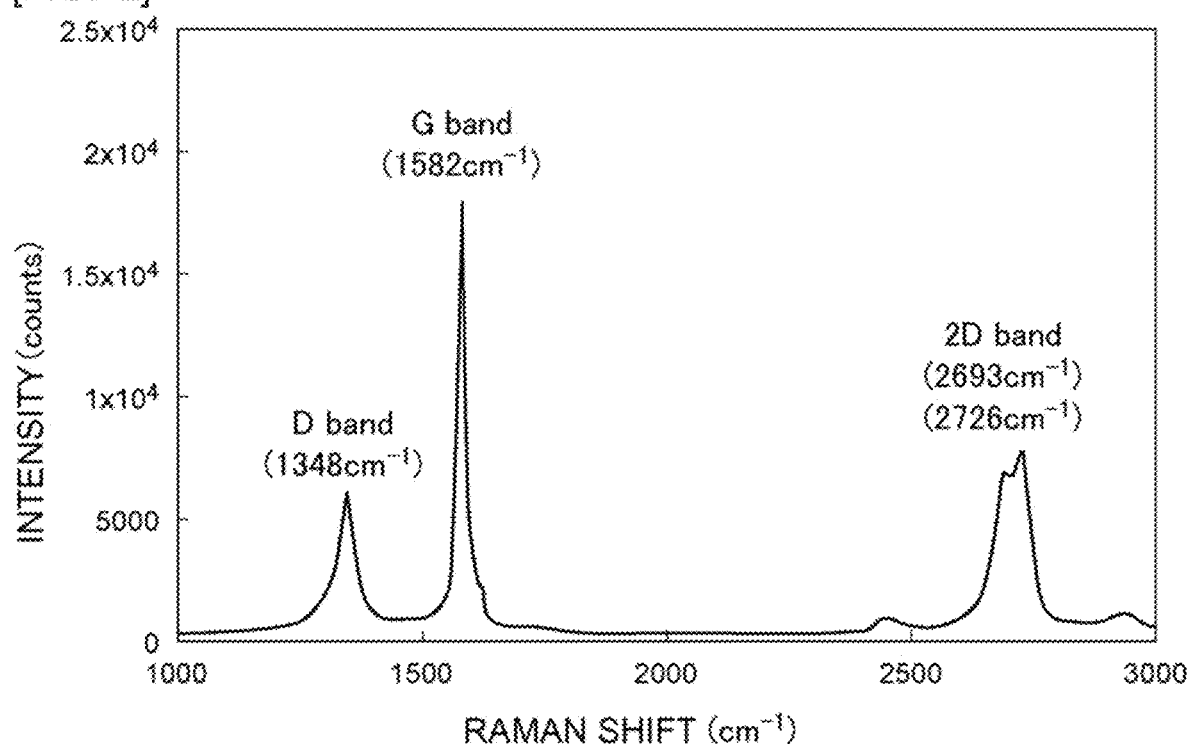

[FIG. 3]
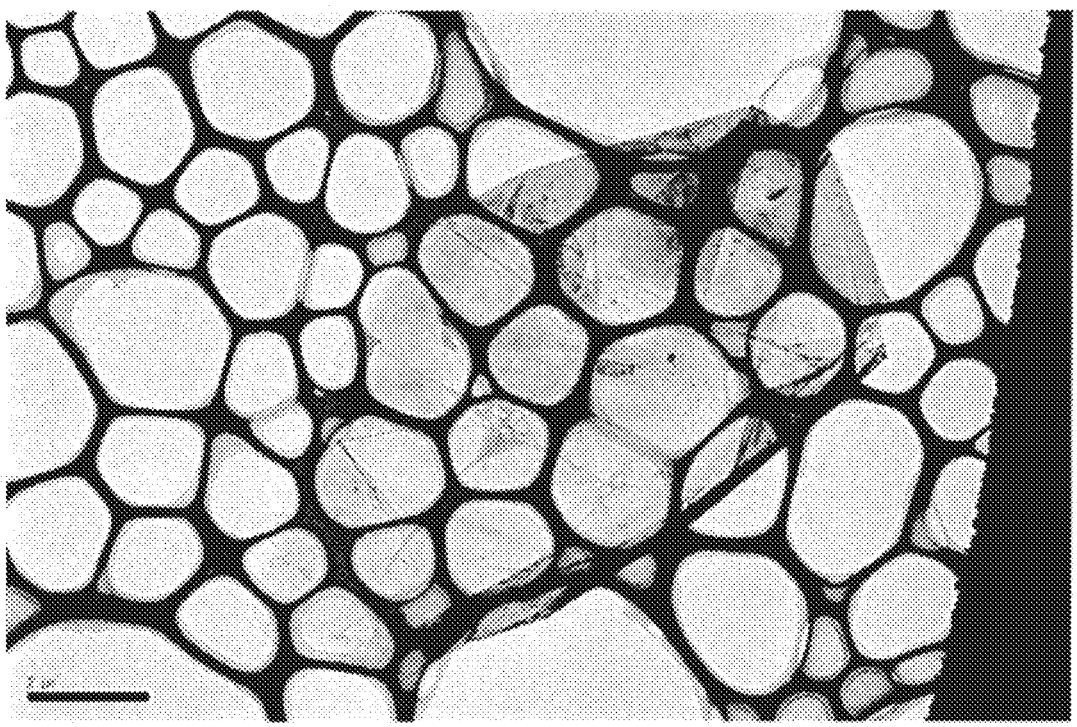
[FIG. 4]
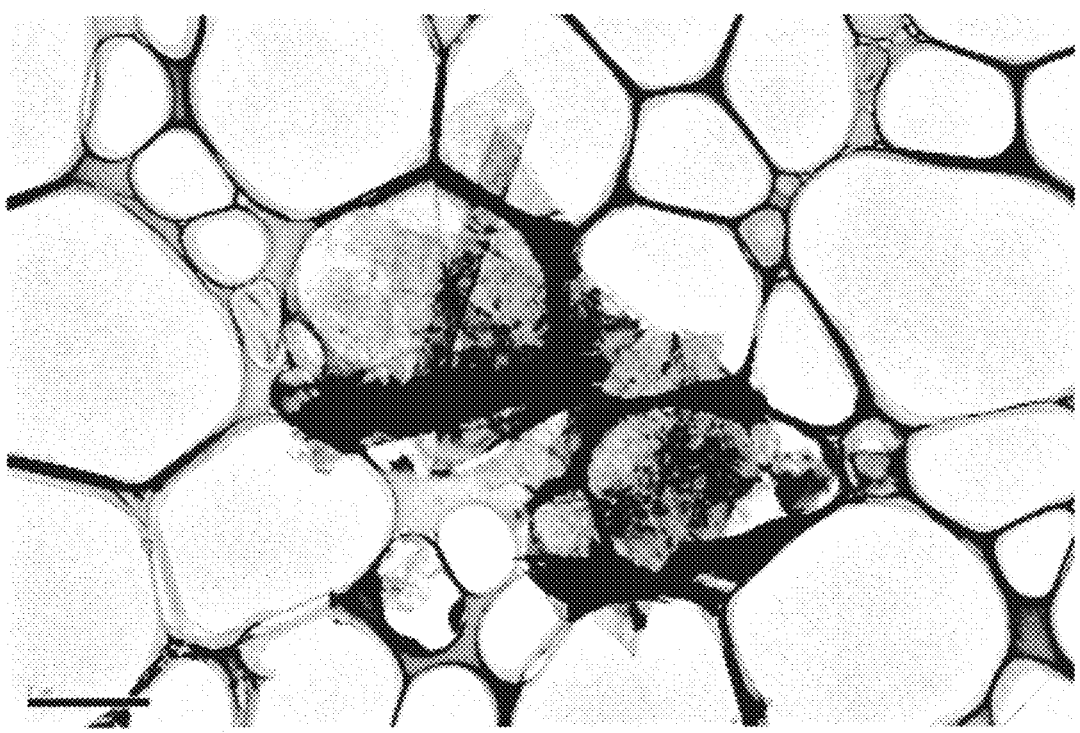

[FIG. 5]
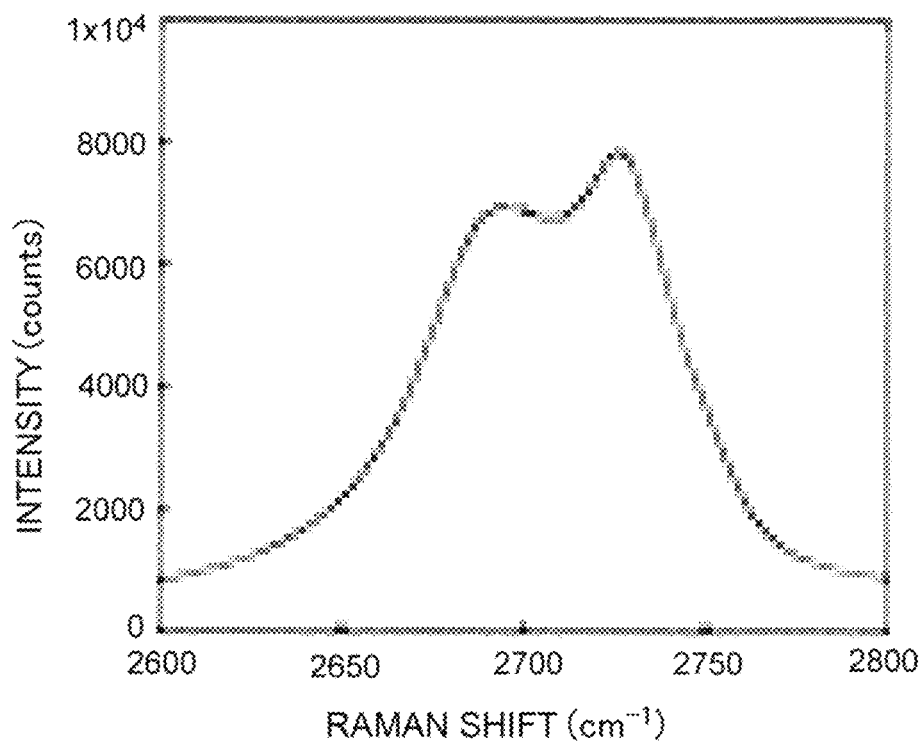
[FIG. 6]
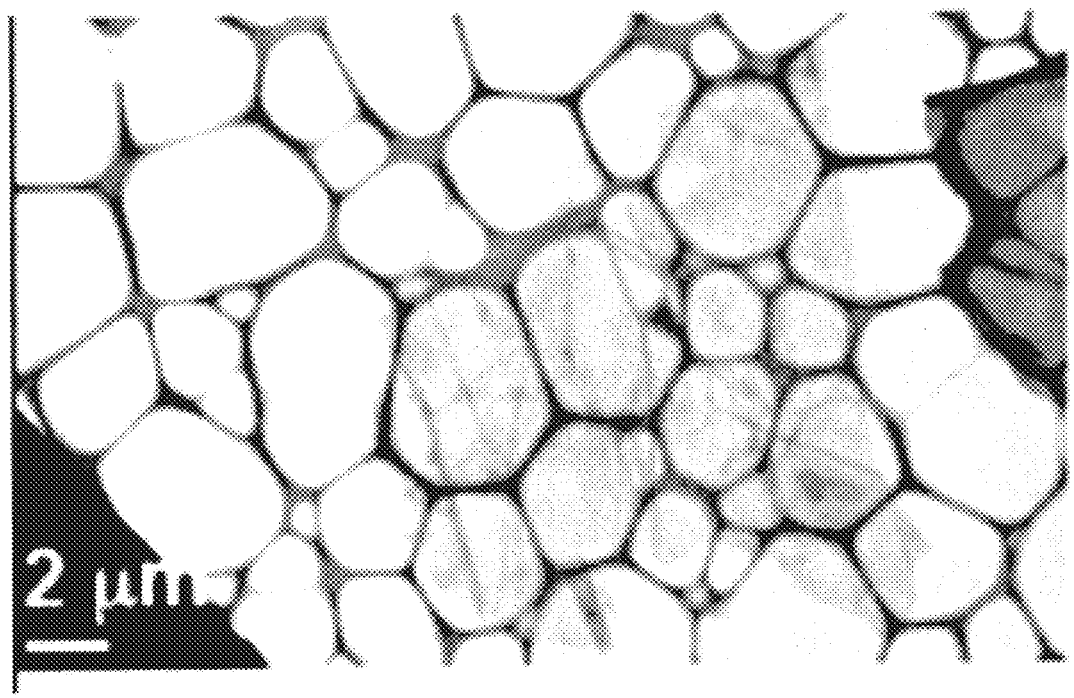

[FIG. 7]
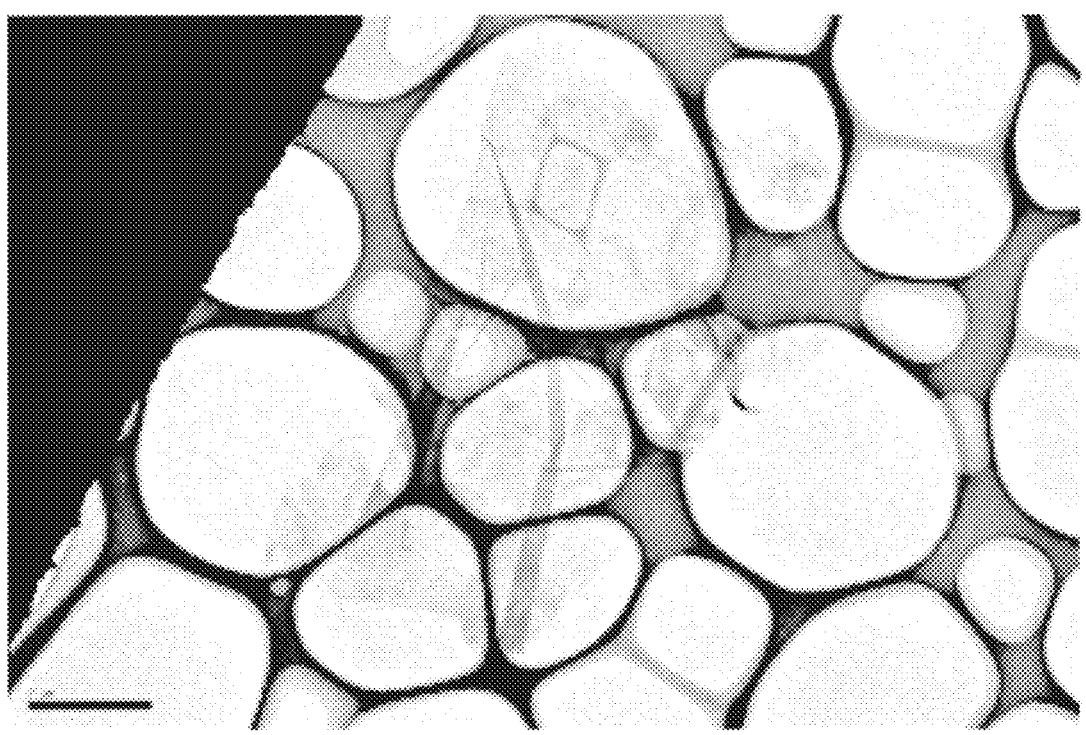

EXFOLIATED GRAPHITE AND MANUFACTURING METHOD THEREFOR

TECHNICAL FIELD

The present invention relates to exfoliated graphite, which is graphene or a laminate of graphene sheets, and to a method for manufacturing the exfoliated graphite.

BACKGROUND ART

Carbon materials have been conventionally used widely as a resin reinforcing material, a conductive material, or a heat conductive material. Carbon materials have been recently studied for use in an electrode material for a secondary battery, such as a lithium ion secondary battery, or a capacitor. Examples of such carbon materials include graphite, carbon nanotubes, and exfoliated graphite. The exfoliated graphite is produced through exfoliating graphite, and is graphene or a laminate of graphene sheets that is thinner than. the original graphite.

As a method for manufacturing exfoliated graphite, for example, a method is known in which a graphite intercalation compound (GIC) is used. In this method, an alkali metal is intercalated between graphene layers in graphite. Then, the graphite is exfoliated through exfoliating treatment such as ultrasonic treatment or heat treatment. As a result, exfoliated graphite can be obtained.

Patent Document 1 below discloses a method for producing exfoliated graphite in which graphite is exfoliated through mixing a GIC is which at least an alkali metal is intercalated between graphene layers in graphite with an organic halogen compound. Patent Document 1 describes that at least a part of the surface of the obtained exfoliated graphite is covered with the organic halogen compound.

RELATED ART DOCUMENT

Patent Document

Patent Document 1: JP 2017-19695 A

SUMMARY OF THE INVENTION

Problems to be Solved by the Invention

However, it is difficult to obtain exfoliated graphite having a small number of stacked graphene sheets using a conventional simple method such as ultrasonic treatment or heat treatment, and even when exfoliated graphite having a small number of stacked graphene sheets is obtained, an attempt to disperse the exfoliated graphite in a resin or a solvent may cause a fold and a curl of the exfoliated graphite. The fold and the curl of the exfoliated graphite may cause, for example, a case where the resin cannot be improved in the physical property such as the mechanical strength.

Furthermore, the exfoliated graphite obtained through mixing a GIC with an organic halogen compound as described in Patent Document 1 has a problem, for example, that an electrode easily corrodes when the exfoliated graphite is used as the electrode material.

An object of the present invention is to provide exfoliated graphite that rarely folds, rarely curls, and rarely causes corrosion of an electrode when used as the electrode material, and to provide a method for manufacturing the exfoliated graphite.

Means for Solving the Problems

As a result of intensive studies, the inventors of the present application have found that it, is possible to solve the above-described problems by setting, in exfoliated graphite being graphene or a laminate of graphene sheets, the ratio 2 D/G that is a peak area ratio of the 2 D band to the G band in the Raman spectrum and the halogen content to specific ranges, and completed the present invention.

That is, the exfoliated graphite according to the present invention is exfoliated graphite being graphene or a laminate of graphene sheets, the exfoliated graphite having a ratio 2 D/G of 0.5 or more and 5.0 or less, the ratio 2 D/G being a peak area ratio of a 2 D band to a G band in a Raman spectrum measured using Raman spectroscopy, and a halogen content of 1,000 ppm or less.

In a specific aspect of the exfoliated graphite according to the present invention, the exfoliated graphite has a surface modified with a functional group derived from a compound having a carbonyl group.

In another specific aspect of the exfoliated graphite according to the present invention, the compound having a carbonyl group is an aldehyde derivative.

In still another specific aspect of the exfoliated graphite according to the present invention, the aldehyde derivative is an alkylaldehyde.

In still another specific aspect of the exfoliated graphite according to the present invention, the weight loss is 1% by weight or more and 50% by weight or less in thermogravimetric analysis of the exfoliated graphite under an argon gas atmosphere in a temperature range of 23° C. to 300° C. at a temperature rise rate of 2° C./min, In still another specific aspect of the exfoliated graphite according to the present invention, the exfoliated graphite has 1 or more and 15 or less graphene sheets stacked.

The method manufacturing exfoliated graphite according to the present invention includes the steps of preparing a graphite intercalation compound in which at least an alkali metal is intercalated between graphene layers in graphite, and exfoliating the graphite through mixing the graphite intercalation compound and a compound having a carbonyl group to obtain exfoliated graphite.

Effect of the Invention

According to the present invention, it is possible to provide exfoliated graphite that rarely folds, rarely curls, and rarely causes corrosion of an electrode when used as the electrode material, and to provide a method for manufacturing a the exfoliated graphite.

BRIEF DESCRIPTION OF DRAWINGS

FIG. 1 is a transmission electron microscope (TEM) photograph of the section of exfoliated graphite obtained in Example 1.

FIG. 2 is a graph showing the Raman spectrum of the exfoliated graphite obtained in Example 1.

FIG. 3 is a transmission electron microscope (TEM) photograph of the section of exfoliated graphite obtained in Example 2.

FIG. 4 is a transmission electron microscope (TEM) photograph of the section of exfoliated graphite obtained in Comparative Example 1.

FIG. 5 is an enlarged view of the vicinity of the peak of the 2 D band in FIG. 2.

FIG. 6 is a transmission electron microscope (TEM) photograph of the section of exfoliated graphite obtained in Example 3.

FIG. 7 is a transmission electron microscope (TEM) photograph of the section of exfoliated graphite obtained in Example 4.

MODES FOR CARRYING OUT THE INVENTION

Hereinafter, details of the present invention will be described.

[Exfoliated Graphite]

The exfoliated graphite according to the present invention is graphene or a laminate of graphene sheets. In the present invention, when the Raman spectrum of the exfoliated graphite is measured using Raman spectroscopy, the exfoliated. graphite has a ratio 2 D/G, the peak area ratio of the 2 D band to the G band in the Raman spectrum, of 0.5 or more and 5.0 or less. Furthermore, the exfoliated graphite has a halogen content of 1,000 ppm or less.

The present inventors focused on the ratio 2 D/G that is the peak area ratio of the 2 D band to the G band in the Raman spectrum, and have found that the exfoliated graphite having a ratio 2 D/G set in the above-described specific range can maintain the planar structure and can be prevented from folding and curling. At the same time, the present inventors focused on the halogen content of the exfoliated graphite, and have found that the exfoliated graphite having a halogen content set to the above-described upper limit or less can be prevented from causing corrosion of an electrode when a used as the electrode material.

The exfoliated Graphite according to the present invention rarely folds and rarely curls. Therefore, the exfoliated graphite has excellent dispersibility in a resin to enhance the physical property such as the mechanical strength of the resin effectively. Furthermore, the exfoliated graphite can maintain the planar structure in a resin or a solvent to enhance the gas barrier property.

The exfoliated graphite according to the present invention has a ratio 2 D/G in the above-described specific range, and therefore, has few structural defects. As a result, the flame retardancy, the conductivity, and the thermal conductivity are enhanced. Furthermore, the exfoliated graphite can maintain the planar structure in a resin or a solvent. Therefore, for example, a conductive path is easily formed when the exfoliated graphite is used as an electrode material, and the conductivity can be enhanced from this point as well. In addition, as described above, the exfoliated graphite rarely causes corrosion of an electrode. Therefore, the exfoliated graphite according to the present invention can be suitably used as an electrode material for a secondary battery, such as a lithium ion secondary battery, or a capacitor.

In the present invention, the ratio 2 D/G that is the peak area ratio of the 2 D band to the G band in the Raman spectrum is 0.5 or more and preferably 1.0 or more, and 5.0 or less, preferably 3.0 or less, and more preferably 2.0 or less. When the ratio 2 D/G is the above-described lower limit or more, the number of stacked layers of graphene in the exfoliated graphite can be further reduced. Furthermore, the exfoliated graphite can maintain the planar structure further reliably, and can be further reliably prevented from folding and curling. When the ratio 2 D/G is above-described upper limit or less, the physical properties such as the conductivity and the mechanical strength of the resin can be further effectively enhanced.

In the present invention, the Raman spectrum can be obtained in the range of 3,100 $cm^{-1}$ to 700 $cm^{-1}$ by, for example, a laser Raman microscope. As the laser Raman microscope, for example, "LabRAM ARAMIS" (product name) manufactured by HORIBA, Ltd. and "Raman touch" (product name) manufactured by Nanophoton Corporation can be used.

The peak of the 2D band in the Raman spectrum is a peak derived from the number of layers, the strain, and the defect structure of the graphene sheet in the exfoliated graphite. The peak of the 2 D band is usually observed in the vicinity of 2,650 $cm^{-1}$ to 2,750 $cm^{-1}$ in the Raman spectrum.

The peak of the G band in the Raman spectrum is a peak derived from the in-plane stretching vibration of the six-membered ring structure of the carbon atoms. The peak of the G band is usually observed in the vicinity of 1,578 $cm^{-1}$ to 1,592 $cm^{-1}$ in the Raman spectrum.

Such a ratio 2 D/G that is the peak area ratio of the 2 D band to the G band is an index of the number of layers, the strain, and the defect structure of the graphene sheet in the exfoliated graphite. The larger the ratio 2 D/G that is the peak area ratio of the 2 D band to the G band is, the smaller the number of stacked graphene sheets tends to be. Even if the number of stacked graphene sheets is small, the exfoliated graphite can maintain the planar structure further reliably, and can be further reliably prevented from folding and curling.

The peak of the D band in the Raman spectrum is a peak derived from the defect structure. The peak of the D band is usually observed in the vicinity of 1,345 $cm^{-1}$ to 1,355 $cm^{-1}$ in the Raman spectrum.

The ratio D/G that is the peak area ratio of the D band to the G band is an index of the amount of defects in the exfoliated graphite. The smaller the ratio D/G that is the peak area ratio of the D band to the G band is, the smaller the amount of defects in the exfoliated graphite is.

Therefore, the exfoliated graphite according to the present invention preferably has a ratio D/G of 0.8 or less, and more preferably 0.5 or less. When the ratio D/G is the above-described upper limit or less, the amount of defects in the exfoliated graphite can be further reduced, and the conductivity can be further enhanced. The lower limit of the ratio D/G is not particularly limited, and can be, for example, 0.01.

In the present invention, the exfoliated graphite preferably has a halogen content of 1,000 ppm or less, and more preferably 500 ppm or less. When the exfoliated graphite has a halogen content of the above-described upper limit or less, the exfoliated graphite can be further reliably prevented from causing corrosion of an electrode when used as the electrode material. The lower limit of the halogen content is not particularly limited, and can be, for example, 0.01 ppm.

In the present invention, the halogen content can be measured by, for example, ion chromatography.

For example, the halogen content can be measured using ion chromatography as described below.

First, purified water is added to exfoliated graphite, and the resulting mixture is subjected to ultrasonic treatment to obtain a dispersion. The obtained dispersion is centrifuged and then filtered to obtain a filtrate to be used as a test liquid. The obtained test liquid is measured with an ion chromatography device to determine the halogen content. As the ion chromatography device, for example, DIONEX ICS-1500 (column: IonPac AS23A (separation column)) manufactured by Thermo Fisher Scientific K. K. can be used.

In the present invention, the exfoliated graphite is produced through exfoliating the original graphite, and is graphene or a laminate of graphene sheets that is thinner than the original graphite. The exfoliated graphite added to a resin in a small amount can dramatically improve the physical property of the resin. Therefore, the exfoliated graphite can be used as a so-called nanofiller.

Whether a matter is a laminate of graphene sheets can be confirmed by, in measurement of its X-ray diffraction spectrum using a CuKα ray (wavelength: 1.541 Å), whether a peak in the vicinity of 2θ=26.4 degrees (a peak derived from a graphene laminated structure) is observed. The X-ray diffraction spectrum can be measured using a wide-angle X-ray diffraction method. As the X-ray diffractometer, for example, SmartLab (manufactured by Rigaku Corporation) can be used.

The number of stacked graphene sheets in the exfoliated graphite is to be smaller than that in the original graphite, and the number of stacked graphene sheets in the exfoliated graphite is one or more. The smaller the number of stacked graphene sheets is, the more desirable the number is, from the viewpoint of enhancing the mechanical strength such as the tensile elastic modulus of the resin further effectively. Therefore, the number stacked graphene sheets is preferably 15 or less, and more preferably 10 or less.

The exfoliated graphite preferably has a thickness of 0.3 nm or more and more preferably 1 nm or more, and preferably 30 nm or less and more preferably 10 nm or less. When the thickness of the exfoliated graphite is in the above-described range, the mechanical strength such as the tensile elastic modulus of the resin can be further effectively enhanced.

The exfoliated graphite preferably has a maximum dimension in the laminate surface direction of 0.1 μm or more and more preferably 1 μm or more, and preferably 200 μm or less and more preferably 100 μm or less. When the maximum dimension of the exfoliated Graphite in the laminate surface direction is the above-described lower limit or more, the reinforcing effect can be further enhanced against the external force applied in the direction intersecting the laminate surface of the exfoliated graphite. When the maximum dimension of the exfoliated graphite in the laminate surface direction is the above-described upper limit or less, the exfoliated graphite used as a reinforcing material is less likely to be a fracture starting point or a peeling starting point due to a composite interface when filled in a matrix material (such as a resin, a metal, or a ceramic).

The ratio of the maximum dimension of the exfoliated graphite in the laminate surface direction to the thickness of the exfoliated graphite is shown as the aspect ratio. The exfoliated graphite preferably has an aspect ratio of 10 or more and more preferably 100 or more, and preferably 600,000 or less and more preferably 10,000 or less. When the aspect ratio of the exfoliated graphite is the above-described lower limit or more, the reinforcing effect can be further enhanced against the external force applied in the direction intersecting the laminate surface or the exfoliated graphite. If the aspect ratio of the exfoliated graphite is too urge, the effect is sometimes saturated and a further reinforcing effect is not to be obtained.

The aspect ratio of the exfoliated graphite can be determined. using a scanning electron micrograph (SEM photograph) or the like.

In the present invention, the exfoliated graphite preferably has a surface modified with a functional group derived from a compound having a carbonyl group. In this case, the exfoliated graphite can be further prevented from folding and curling. Furthermore, the compatibility with a highly polar resin such as an epoxy resin can be further enhanced. Therefore, the dispersibiiity of the exfoliated graphite in the resin can be further enhanced. As a result, the exfoliated graphite added even in a small amount can enhance the mechanical property of the resin further effectively.

The compound having a carbonyl group may be grafted on the exfoliated graphite. Whether a compound derived from a compound having a carbonyl group is grafted on the exfoliated graphite can be confirmed using Fourier transform infrared spectrometer (FT-IR) or thermogravimetric analysis.

The compound having a carbonyl group not particularly limited, and for example, aldehyde derivatives, ketone derivatives, and ester derivatives can be used. The compound having a carbonyl group is preferably an aldehyde derivative among the above-described derivatives. In this case, the exfoliated graphite can be further reliably prevented from folding and curling.

The aldehyde derivative is not particularly limited, and examples of the aldehyde derivative include benzaldehyde, O-phthalaldehyde, O-anisaldehyde, m-anisaldehyde, p-anisaldehyde, phthalaldehyde, 1-naphthaldehyde, 9-anthraldehyde, glucose, retinal, formaldehyde, acetaldehyde, butylaldehyde, heptanal, octanal, decanal, isovaleraldehyde, glutaraldehyde, azulene-1-carboxyaldehyde, and acetoacetaldehyde dimethyl acetal. Among the above-described aldehyde derivatives, alkylaldehydes are preferable. Furthermore, aldehyde derivatives having a linear alkyl chain are preferably used. The aldehyde derivatives preferably have a long alkyl chain. The alkyl chain preferably includes a linear portion having 6 or more carbon atoms, and more preferably 7 or more carbon atoms. In this case, the exfoliated graphite can be further reliably prevented from folding and curling. The upper limit of the number of carbon atoms in the linear portion of the alkyl chain can be, for example, 20.

As the ketone derivative, for example, acetone, methyl ethyl ketone, methyl isobutyl ketone, cyclohexanone, acetylacetone, acetophenone, benzophenone, quinone, benzoquinone, and naphthoquinone can be used.

As the ester derivative, esters of an organic carboxylic acid and an alcohol can be used. Examples of the ester include ethyl acetate, butyl acetate, butyl butyrate, 2-ethylhexyl acetate, octyl acetate, bis(2-ethylhexyl) add pate, bis(2-ethylhexyl) dodecanedioate, dioctyl phthalate, dioctyl maleate, trimethylolpropane triacetate, and pentaerythritol tetraacetate.

The compounds having a carbonyl group may be used singly or in combination of two or more kinds thereof.

In the present invention, the weight loss is preferably 1.0% by weight or more and more preferably 5.0% by weight or more, and preferably 50% by weight or less and more preferably 30% by weight or less in thermogravimetric analysis of the exfoliated graphite under an argon gas atmosphere in a temperature range of 23° C. to 300° C. at a temperature rise rate of 2° C./min. The weight loss corresponds to, for example, the content of the compound having a carbonyl group and covering the exfoliated graphite. Therefore, the weight loss is shown as a grafting rate when a compound having a carbonyl group is grafted on the exfoliated graphite.

When the weight loss is the above-described lower limit or more, the exfoliated graphite can be further prevented from folding and curling. When the weight loss is the above-described upper limit or less, the conductivity and the thermal conductivity of the exfoliated graphite itself can be further enhanced.

[Method for Manufacturing Exfoliated Graphite]

The exfoliated graphite according to the present invention can be obtained, for example, using a method for manufacturing including the following Steps 1 and 2.

(Step 1)

Step 1 is a step of preparing a graphite intercalation compound (GIC) in which at least an alkali metal is intercalated between graphene layers in graphite.

The graphite is a laminate of a plurality of graphene sheets. The number of stacked graphene sheets in the graphite is usually about 100,000 to 1,000,000. The graphite is not particularly limited, and appropriate raw material graphite can be used such as natural graphite or expanded graphite. The term "expanded graphite" refers to graphite in which the distance between graphene layers in the graphite is larger than that in natural graphite. In the expanded graphite, the original distance between graphene layers is large, therefore, an alkali metal can be further easily intercalated between the graphene layers.

The alkali metal is not particularly limited, and K, Li, Na, and the like can be used. The alkali metals may be used singly or in combination of two or more kinds thereof. As the alkali metal, K or Na is preferably used.

It is desirable that the GIC to be prepared be a ternary GIC in which an alkali metal and tetrahydrofuran (THF) are intercalated between graphene layers. However, in the present invention, a binary GIC, may be prepared in which only an alkali metal is intercalated between graphene layers.

The ternary GIC can be obtained by, for example, dissolving an alkali metal in THF, then adding graphite, and stirring the resulting mixture.

It is desirable that the alkali metal is added to a mixed solution of THF and an aromatic hydrocarbon to dissolve the alkali metal in THF. In this case, the alkali metal and the aromatic hydrocarbon form an ion pair in the mixed solution, and thus, the alkali metal can be coordinated to THF. In this way, the alkali metal can be easily dissolved that is originally difficult to dissolve in THF. It is desirable that this operation be performed in an inert Gas atmosphere.

The THF is not particularly limited, and it is desirable to use THF containing substantially no dibutylhydroxytoluene (BHT). Furthermore, it is desirable to use sufficiently dehydrated THF.

The aromatic hydrocarbon is preferably a polycyclic aromatic hydrocarbon. The polycyclic aromatic hydrocarbon is not particularly limited, and examples thereof include naphthalene, phenanthrene, and anthracene. The polycyclic aromatic hydrocarbons may be used singly or in combination of two or more kinds thereof.

Such an aromatic hydrocarbon and graphite are very different in electron affinity. For example, the electron affinity of graphite is 1.27 eV, while that of naphthalene is −0.25 eV. Therefore, the difference in electron affinity between graphite and an aromatic hydrocarbon can be utilized to easily intercalate the alkali metal coordinated to THF between graphene layers.

The inert gas is not particularly limited as long as it can block oxygen, and for example, an argon gas and the like can be used.

(Step 2)

Step 2 is a step of exfoliating the graphite by mixing the GIC and a compound having a carbonyl group to obtain. exfoliated graphite.

Specifically, a liquid containing a compound having a carbonyl group is added to the GIC, and the resulting mixture is stirred. As the compound having a carbonyl group, the compound described in the section of exfoliated graphite above can be used. When the compound having a carbonyl group is liquid, the compound can be used as it is as the above-described liquid. When the compound having a carbonyl group is solid, another solvent such as THF is added to the compound, and the resulting mixture can be used as the above-described liquid.

It is also desirable that Step 2 be performed in an inert gas atmosphere. The inert gas is not particularly limited as long as it can block oxygen, and for example, an argon gas and the like can be used.

In Step 2, a nucleophilic addition reaction occurs on the carbon hexagonal plane of the graphite by adding a compound having an electron-withdrawing carbonyl group to the GIC. Specifically, a compound having a carbonyl group is chemically bonded to the graphite and grafted between the graphene layers or at the graphene edge. Therefore, a compound having a carbonyl group and having a larger size than the original alkali metal is inserted between the graphene layers in the graphite.

When the compound having a carbonyl group and having a larger size than the original alkali metal is inserted between the graphene layers, exfoliation. of the graphite is caused. As a result, exfoliated graphite can be obtained. At least a part of the surface of the obtained exfoliated graphite can be covered with the compound having a carbonyl group using grafting or the like.

Because at least a part of the surface of the obtained exfoliated graphite is covered with the compound having a carbonyl group, the flakes of the obtained exfoliated graphite are less likely to be restacked, and exfoliated graphite can be efficiently obtained in which the number of stacked graphene sheets is further small.

Furthermore, because at least a part of the surface of the exfoliated graphite is covered with the compound having a carbonyl group, the obtained exfoliated graphite can maintain the planar structure and can be prevented from folding and curling. Therefore, the exfoliated graphite added to a resin can further enhance the physical property such as the mechanical strength of the resin. Furthermore, when the exfoliated graphite is used as an electrode material or the like, a conductive path is easily formed. In addition, the exfoliated graphite is also excellent in handleability.

This method for manufacturing includes no step of oxidizing graphite. As a result, the obtained exfoliated graphite has few defects and a low degree of oxidation. Therefore, the obtained exfoliated graphite is excellent in flame retardancy, conductivity, and thermal conductivity.

Furthermore, in this method for manufacturing, compounds containing a halogen such as organic halogen compounds are not positively used. As a result, the halogen content of the obtained exfoliated graphite can be small. Therefore, the obtained exfoliated graphite is less likely to cause corrosion of as electrode when used as the electrode material. Therefore, the obtained exfoliated graphite can be suitably used as an electrode material for a secondary battery, such as a lithium ion secondary battery, or a capacitor.

Next, the present invention will be clarified by giving specific Examples and Comparative Examples of the present invention. Note that the present invention is not limited. to Examples shown below.

Example 1

Preparation of GIC;

In a glove box under an argon gas atmosphere (argon gas concentration: 99.999% or more, dew point: −80° C. or less), 1.5 g of naphthalene and 0.5 g of potassium were added to $20\times10^{-3}$ dm$^3$ of THF to prepare a mixed solution. The prepared mixed solution was stirred with a stirrer at a rotation speed of 200 rpm for 30 minutes. After the stirring, 0.5 g of natural graphite powder (manufactured by SEC CARBON, LIMITED, grade: SN-100, average particle size: 100 μm) was added. Then, the resulting mixed solution was stirred again with a stirrer at a rotation speed of 200 rpm for 1 day. After the stirring, the obtained mixed solution was filtered in a glove box under an argon gas atmosphere to obtain a K-THF-GIC in which potassium (K) and THF were intercalated. The obtained K-THF-GIC was subjected twice to the washing step of immersing in $20\times10^{-3}$ dm$^3$ and filtering. The washed K-THF-GIC was deep blue.

Preparation of Exfoliated Graphite;

After the washing, 0.05 g of the obtained K-THF-GIC was put into a sample bottle in a glove box under an argon gas atmosphere. Subsequently, $5.5\times10^{-2}$ mol of decanal was added to the sample bottle, and the resulting mixture was stirred with a stirrer at a rotation speed of 100 rpm at room temperature for 72 hours. Then, the mixture was allowed to stand for 5 minutes and separated into a supernatant and a precipitate, and the obtained supernatant was centrifuged at a rotation speed of 15,000 rpm for 15 minutes to remove decanal and obtain a precipitate. To the obtained precipitate, 10 mL of THF was added, and the resulting mixture was centrifuged at a rotation speed of 15,000 rpm for 15 minutes to obtain a precipitate. The same operation was repeated to wash unreacted decanal and obtain a precipitate. Furthermore, 10 mL of ion-exchanged water was added to the obtained precipitate, and the resulting mixture was centrifuged at a rotation speed of 15,000 rpm for 15 minutes to obtain exfoliated graphite. The surface of the obtained exfoliated graphite was covered with decanal.

FIG. 1 is a transmission electron microscope (TEM) photograph of the section of the obtained exfoliated graphite. FIG. 1 is a TEM photograph of the sample obtained through adding decanal to the K-THF-GIC and stirring the resulting mixture at room temperature for 72 hours. The TEM photograph was measured using a transmission electron microscope (manufactured by JEOL Ltd., product number: JEM-2100). From FIG. 1, it was confirmed that the obtained exfoliated graphite had a flat plate shape and an area of 60 μm$^2$. The number of the stacked graphene sheets in the obtained exfoliated graphite was 3.

(Evaluation)

Raman Spectrum:

The exfoliated graphite obtained in Example 1 was dispersed on a glass plate, and in the region in which the exfoliated graphite was dispersed in a fine powder form, Raman imaging was performed using a microlaser Raman spectrometer (manufactured by HORIBA, Ltd., product name "LabRAM ARAMIS") under the following measurement conditions.

[Measurement Conditions]
Laser: 514 nm, 100% output
Measurement range: 3,100 cm$^{-1}$ to 700 cm$^{-1}$
Objective lens: magnification ratio 100
Aperture: 100 μm slit
Exposure time: 1 second/line (measurement time: 1 hour)

FIG. 2 is a graph showing the Raman spectrum of the exfoliated graphite obtained in Example 1. FIG. 5 is an enlarged view of the vicinity of the peak of the 2 D hand in FIG. 2. FIGS. 2 and 5 show the Raman spectrum of the sample obtained through adding decanal to the K-THF-GIC and stirring the resulting mixture at room temperature for 72 hours. From FIGS. 2 and 5, it can be seen that the obtained Raman spectrum has a peak in the 2 D band.

The obtained data were analyzed using analysis software (manufactured by Nanophoton Corporation, product name "RAMAN Viewer"). Through the analysis, the peak areas of the G band and the 2 D band were determined, and the ratio 2 D/G was calculated. In Example 1, the ratio was 1.3.

Although the Raman spectrum of 2 D band in FIGS. 2 and 5 has two peaks, the total area of both peaks was calculated as the peak area of the 2 D for determination of the ratio of 2 D/G.

Halogen Content;

In a test tube, 0.03 g of the exfoliated graphite obtained in Example 1 was precisely weighed and put, 2.5 mL of purified water was added thereto, and the resulting mixture was subjected to ultrasonic treatment (using "VCL-22545" manufactured by VELVO CLEAR through 20 minutes of irradiation, 30 minutes of standing, and 20 minutes of irradiation at a water temperature of 15° C., and then 10 minutes of irradiation at a water temperature of 23° C.). The obtained solution was centrifuged (4,000 rpm, 15 minutes) and then filtered to obtain a filtrate to be used as a test liquid.

The halogen (chlorine ion) content in the obtained test liquid was determined using an ion chromatography device ("DIONEX ICS-1500" manufactured by Thermo Fisher Scientific K. K., column: IonPac AS23A (separation column), eluent: 0.45 mmol $Na_2CO_3$, 0.8 mmol/L $NaHCO_3$, injection volume: 100 μL, flow rate: 100 mL/min, detector: electric conductivity).

The halogen content was 280 ppm in Example 1.

Thermogravimetric Analysis;

The exfoliated graphite obtained in Example 1 was subjected. to thermogravimetric analysis using a simultaneous thermal analyzer (manufactured by SII, product number: TG/DTA6300) under an argon gas atmosphere in. a temperature range of 23° C. to 300° C. at a temperature rise rate of 2° C./min. The weight loss at 100° C. to 300° C. was regarded as a decomposition product derived from decanal, and thus the graft ratio of decanal was determined to be 11.4% by weight.

Example 2

Exfoliated graphite was prepared and evaluated in the same manner as in Example 1 except that decanal in Example 1 was replaced with heptanal.

FIG. 3 is a transmission electron microscope (TEM) photograph of the section of the exfoliated graphite obtained in Example 2. From FIG. 3, it was confirmed that the obtained exfoliated graphite had a flat plate shape and an area of 70 μm$^2$. The number of the stacked graphene sheets in the obtained exfoliated graphite was 5.

The exfoliated graphite obtained in Example 2 had a ratio 2 D/G of 1.1, and a halogen content of 390 ppm. The graft. ratio (the graft ratio of heptanal) was 8.1% by weight.

Example 3

Exfoliated graphite was prepared and evaluated in the same manner as in Example 1 except that decanal in Example 1 was replaced with octadecanal.

FIG. 6 is a transmission electron microscope (TEM) photograph of the section of the exfoliated graphite obtained in Example 3. From FIG. 6, it was confirmed that the obtained exfoliated graphite had a flat plate shape and an area of 70 μm$^2$. The number of the stacked graphene sheets in the obtained exfoliated graphite was 5.

The exfoliated graphite obtained in Example 3 had a ratio 2 D/G of 1.8, and a halogen content of 790 ppm. The graft ratio (the graft ratio of octadecanal) was 17.3% by weight.

Example 4

Exfoliated graphite was prepared and evaluated in the same manner as in Example 1 except that decanal in Example 1 was replaced with bis(2-ethylhexyl) dodecanedioate.

FIG. 7 is a transmission electron microscope (TEM) photograph of the section of the exfoliated graphite obtained in Example 4. From FIG. 7, it was confirmed that the obtained exfoliated graphite had a flat plate shape and an area of 70 µm². The number of the stacked graphene sheets in the obtained exfoliated graphite was 6.

The exfoliated graphite obtained in Example 4 had a ratio 2 D/G of 1.8, and a halogen content of 810 ppm. The graft ratio (the graft ratio of bis(2-ethylhexyl) dodecanedioate) was 11.4% by weight.

Comparative Example 1

Exfoliated graphite was prepared and evaluated in the same manner as in Example 1 except that decanal in Example 1 was replaced with 2-chloro-2-methylpropane.

FIG. 4 is a transmission electron microscope (TEM) photograph of the section of the exfoliated graphite obtained in Comparative Example 1. From FIG. 4, it was confirmed that the obtained exfoliated graphite slightly folded and slightly curled, and had an area of 40 µm². The number of the stacked graphene sheets in the obtained exfoliated graphite was about 9.

The exfoliated graphite obtained in Comparative Example 1 had a ratio 2 D/G of 2.1, and a halogen content of 98,000 ppm. The graft ratio (the graft ratio of 2-chloro-2-methylpropane) was 3.7% by weight.

In a petri dish, a copper piece (5 mm×5 mm×thickness 0.5 mm) was immersed in a dispersion in which 10 mg of the exfoliated graphite obtained in Comparative Example 1 was dispersed in 10 cc of ion-exchanged water. After the immersion, the copper piece and the dispersion was aged at room temperature for 7 days for observation of the state, and blue-green discoloration was observed in the dispersion. The exfoliated Graphite obtained in Examples 1 to 4 was tested in the same manner, but no blue-green discoloration was observed.

From the above, it was confirmed that the exfoliated graphite obtained in Examples 1 to 4 rarely folded, rarely curled, and rarely caused corrosion of an electrode when used as the electrode material, compared with the exfoliated graphite obtained in Comparative Example 1.

The invention claimed is:

1. Exfoliated graphite being graphene or a laminate of graphene sheets, wherein an aldehyde derivative is chemically bonded to a surface of the exfoliated graphite, and
   the exfoliated graphite has
   a ratio 2 D/G of 1.0 or more and 2.0 or less, the ratio 2 D/G being a peak area ratio of a 2 D band to a G band in a Raman spectrum measured using Raman spectroscopy, and
   a halogen content of 1,000 ppm or less.

2. The exfoliated graphite according to claim 1, wherein the aldehyde derivative is an alkylaldehyde.

3. The exfoliated graphite according to claim 1, wherein a weight loss is 1.0% by weight or more and 50% by weight or less in thermogravimetric analysis of the exfoliated graphite under an argon gas atmosphere in a temperature range of 23° C. to 300° C. at a temperature rise rate of 2° C./min.

4. The exfoliated graphite according to claim 1, having 1 or more and 15 or less graphene sheets stacked.

5. A method for manufacturing exfoliated graphite according to claim 1, the method comprising the steps of:
   preparing a graphite intercalation compound in which at least an alkali metal is intercalated between graphene layers in graphite; and
   exfoliating the graphite by mixing the graphite intercalation compound and an aldehyde derivative to obtain exfoliated graphite.

* * * * *